June 5, 1928.

J. T. TRAVERS

SEPARATION VAT

Filed July 20, 1925

1,672,583

John T. Travers INVENTOR.

BY
ATTORNEYS.

Patented June 5, 1928.

1,672,583

UNITED STATES PATENT OFFICE.

JOHN T. TRAVERS, OF COLUMBUS, OHIO, ASSIGNOR, BY DIRECT AND MESNE ASSIGNMENTS, TO THE TRAVERS-LEWIS PROCESS CORPORATION, OF COLUMBUS, OHIO, A CORPORATION OF OHIO.

SEPARATION VAT.

Application filed July 20, 1925. Serial No. 44,671.

This invention relates to an improved separation vat designed for the purpose of quickly and efficiently separating oils from water, and more particularly to the separation of oils from the liquid wastes of manufacturing establishments.

In the past many streams and waterways have been polluted by the oily waste discharged therein from manufacturing establishments, and such accumulated oil has been found to have a detrimental effect upon aquatic life, and the general health and comfort of surrounding communities. The present invention, therefore, consists in the provision of a vat or tank wherein is embodied a peculiar baffle wall arrangement, which divides the vat into a plurality of compartments which are connected by passageways formed between said walls, the construction of the compartments being such that the liquid containing commingled quantities of oil and water is first discharged into one of said compartments and is contained therein a sufficient time to permit of the mechanical separation of the oil from the water, outlets being provided contiguous to the upper portion of each compartment to permit of the separate withdrawal of the oil and water.

Another object of this invention resides in the provision of a tank or vat of the above character which is so formed that the circulation of water therethrough will be accomplished in a slow and delayed manner. The compartments may be filled with the liquid so that the separation of the oil may be readily effected by permitting the latter to float upon the surface of the water, the slow circulation of water through the tank permitting of the accumulation of oil upon the surface of the water and preventing the entraining thereof with the slowly moving body of water.

In the accompanying drawings wherein my invention is illustrated—

Figure 1:
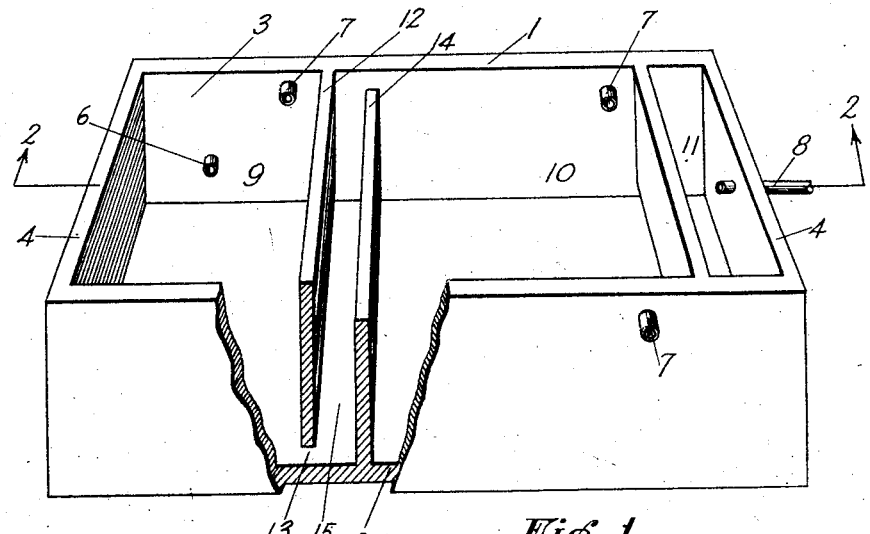
Figure 2:
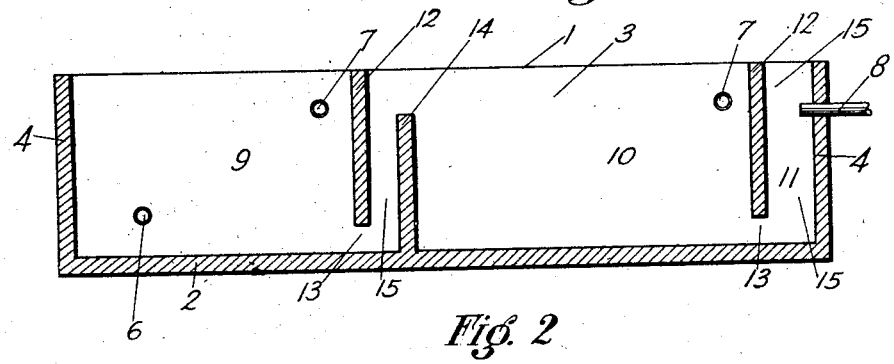

Figure 1 is a perspective view with parts broken away to show the interior construction of my novel separating vat and Figure 2 is a vertical longitudinal section taken on line 2—2 of Figure 1.

Referring more particularly to the drawing, the numeral 1 designates the tank or vat employed in effecting the separation of oil from water or other liquids of industrial waste. This vat may be of any desired size or proportion, which is a matter to be gauged by the particular output or capacity of each individual vat, or in other words, the size of the vat is regulated in accordance with the quantity of liquids to be handled thereby. As shown, the vat is formed with a closed bottom 2, and upstanding side and end walls 3 and 4 respectively. Under ordinary conditions this vat has an open top. Liquid may be admitted into the vat through one or more valved inlet pipes 6, and withdrawn therefrom by way of the oil and water outlets 7 and 8 respectively. In practice it is found that the oil has a tendency to accumulate upon the surface of the water in different positions depending largely upon the direction of the wind and because of this fact a plurality of oil outlets 7 may be arranged around the tank and opened selectively according to the direction of the wind at any particular time.

In order to cause the oil to collect and float upon the top of the water within the vat so as to facilitate the process of removing the oil in the separated state from the vat, the interior of the vat may be provided with a plurality of transverse partitions, which serve to divide the vat, in this instance, into communicating compartments 9, 10 and 11. The multiple partitions each consist of a wall 12, which extends from the upper edge of the vat to a position immediately above and spaced from the upper surface of the bottom 2, whereby a water outlet 13 is provided in the lower part of each compartment. The compartment outlets 13 are preferably much larger than the inlets to avoid water currents through the compartments which might prevent the oil from separating in the intended manner. In combination with the wall 12, the multiple partitions each include a second vertical wall 14, which arises from the bottom 2 of the vat and is spaced from the wall 12 a slight distance to provide an intervening tortuous passageway 15 between the compartments. The upper edge of the wall 14 preferably terminates an appreciable distance below the upper edge of the vat 1. By this construction fluid may flow from the passageway 15 and will be discharged into the next adjacent compartment. This operation may be repeated in any number of compartments depending upon the condition of the fluid, the amount of oil in the water and the extent of separation desired.

From the foregoing description taken in connection with the accompanying drawings, it will be observed that commingled quantities of water and oil or other liquids may be introduced into the vat through the inlet pipes 6, and the fluid so introduced will by virtue of the multiple partition construction first fill the initial compartment 9 before circulating to the next adjacent compartment 10. By the provision of this arrangement, the liquid within the compartment 9 will have an opportunity to settle or separate so that the oil contained therein will gather and float upon the surface of the water, thereby permitting the oil to be withdrawn from the vat by way of the outlets 7 provided in each compartment. This operation may then be repeated in compartment 10, which may be slowly filled with the effluent from compartment 9 by way of the tortuous passageway 15 between walls 12 and 14, before the liquid will flow into compartment 11, and hence any oil which may be found in the water discharged into the compartment 10 may be permitted to separate and may then be withdrawn through a suitable positioned outlet 7 provided adjacent the top thereof. After passing through compartment 11, the water circulates upwardly through the tortuous passageway 15 provided in the end of the tank and is then discharged in a well separated condition by way of outlet 8. It will be observed that in this vat a continuous or forced circulation or current of liquid therethrough is avoided, and the mixture is permitted to separate within each compartment so that the desired separation of the oil therefrom may be effected. Also, by eliminating the objectionable positive and forced circulation of the water, oil will be prevented from becoming entrained therein and thereby precluded from floating to the top of the water in the manner claimed. By virtue of the construction described, however, floating of the oil on the top of the water may be readily brought about and efficient separation thereof may be accordingly effected.

What is claimed is:

1. A process for separating oil constituents from polluted liquids containing such constituents comprising admitting the polluted liquid into an open vat wherein the liquid assumes a quiescent state and the oil collects on the surface thereof, removing the oil from the vat at a point in the plane of the surface of the liquid, and in varying the point of withdrawal of the oil from the vat dependent upon the direction of the wind.

2. A process for separating oily constituents from polluted liquid containing such constituent comprising introducing the polluted liquid into an open vat adjacent the bottom thereof, causing the liquid to flow slowly and in a tortuous path through said vat to permit the oily constituents to collect on the surface of the liquid, removing the oily constituents from the vat a points in the plane of the surface of the liquid in the vat, and controlling the point of removal of the oily constituents from the vat depending upon the direction of the wind passing over said open vat.

In testimony whereof I hereby affix my signature.

JOHN T. TRAVERS.